March 30, 1948.  C. M. WARE  2,438,653
SCALE
Original Filed Nov. 7, 1942
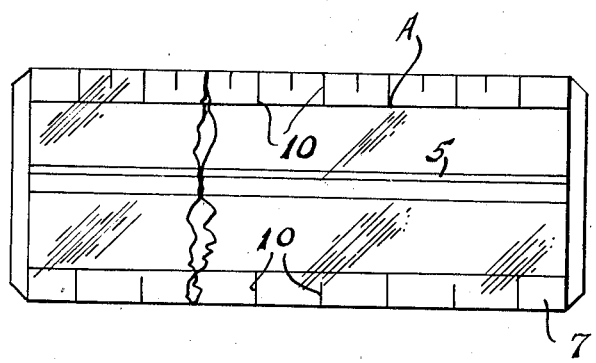
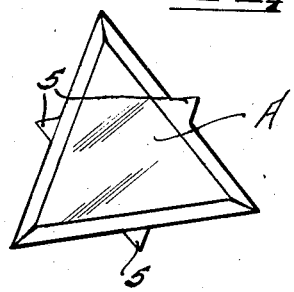
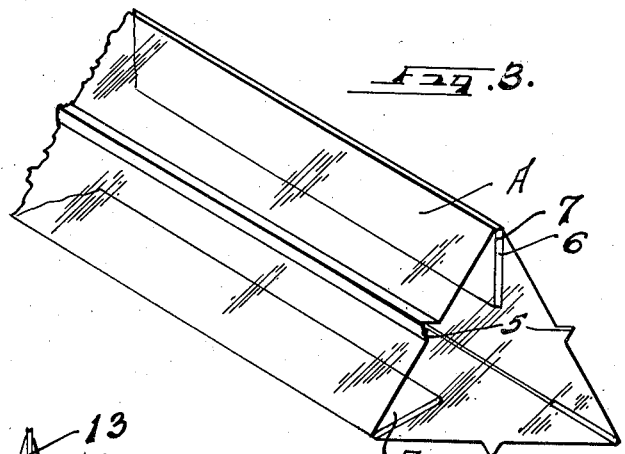
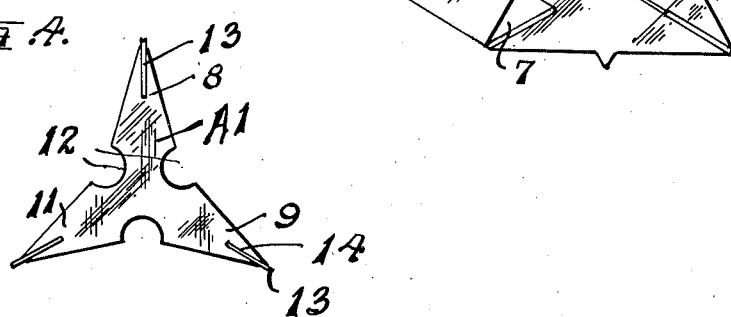
INVENTOR.
Charles. M. Ware
BY R. M. Thomas
Attorney.

Patented Mar. 30, 1948

2,438,653

UNITED STATES PATENT OFFICE 2,438,653

SCALE

Charles M. Ware, Salt Lake City, Utah

Original application November 7, 1942, Serial No. 464,917, now Patent No. 2,365,735, dated December 26, 1944. Divided and this application November 29, 1944, Serial No. 565,598

5 Claims. (Cl. 33—107)

My invention relates to measuring scales and has for its object to provide a new and highly efficient scale for draftsman and others using a scale which must be absolutely perfect in design and accurate in measurement.

A further object is to provide a scale formed of a transparent or opaque material plastic in nature and having each angle of a triangular scale formed with a bifurcating bisecting slot with the indicia marked on the outer surface of the scale and with a strip of opaque material carried in the slot to make the indicia visible from that side of the scale being viewed by the user, and of necessity each side of the scale must be provided with a raised longitudinal ridge to raise the side of the scale from the work thereby protecting the indicia from being worn away with continued use and also protecting the outer surface from being scratched, thereby, protecting the viewing of the indicia.

A still further object is to provide a scale of plastic material having one or both edges provided with a slot along the edge and carrying a strip of opaque material therein, with the indicia marked on the surface of the plastic material, and having a longitudinal central elevated ridge to protect the indicia from being worn and make the scale easier to handle due to the extended ridge.

A still further object is to provide a transparent scale having the indicia printed on the surface and having an opaque insert to bring out the indicia clearly to the user and prevent viewing of the other indicia on the opposite side thereof.

This application is a division of my former pending application for Scales, Serial Number 464,917, filed November 7, 1942, and issued as Patent Number 2,365,735, dated December 26, 1944.

These objects I accomplish with the device illustrated in the accompanying drawings in which similar numerals and letters of reference indicate like parts throughout the several views and as described in the specification forming a part of this application and pointed out in the appended claims.

In the drawings in which I have shown, the preferred embodiment of my invention, Figure 1 is a side elevation of the scale, parts cut away.

Figure 2 is an end view of Figure 1.

Figure 3 is a perspective view of the scale.

Figure 4 is an end view of a modified form of making the scale.

In the drawings I have shown my scale as made of a body A triangular in shape when cross sectioned or viewed from either end and which scale is made of transparent or opaque material preferably of a plastic nature such as "Celluloid," "Lucite" or the like. This body will preferably be made by extruding the material with each face of the scale provided with an extended longitudinal raised rib 5 formed thereon, so that no flat face of the scale can rest upon the surface of the drawing board but having the faces so raised by the rib that there will be no wear on the indicia 10 which is printed on the longitudinal edges of the scale. Each angle or corner of the scale body A is bisected by a longitudinal thin slot 6 into which an opaque strip 7 of material is inserted and secured rigidly therein.

The indicia 10 for the scale is printed along each outer edge of each face of the scale and the opaque strip is to prevent viewing the indicia on the other side of the edge to that being used so that each reading will be clear and concise.

The slot 6 may be milled out or may be formed in the extruding or casting of the scale.

In Figure 4 I have shown a modification of the scale in which view the scale body A1 is formed with each side formed as a small based triangular portion when viewed from the end making the end view of a cross sectional view as a three pointed body, having the points 8, 9 and 11 shaped so that the faces of the scale will be in substance concave and medially of each side of the face I provide a longitudinal groove 12 for ease in handling the scale. The indicia in this type of scale is printed on the outer surface of the points adjacent the opaque strip 13 which is inserted into the longitudinal slot 14 formed bisecting each point. The indicia may also be extended out onto the opaque strip if it is desired to have the markings close to the surface on which the draftsman is working. This feature may also be applied to the scale shown in Figures 1 and 2. The opaque strip may be formed to be flush with the edges of the scale or may be extended as shown and either type is part of this invention.

Having thus described my invention, I desire to secure by Letters Patent and claim:

1. A scale of the class described comprising an elongated transparent body triangular in form when viewed in cross section having indicia printed on the faces thereof adjacent each angled edge; and a parting strip bisecting each angle, said parting strip being opaque.

2. A scale of the class described comprising a transparent elongated triangle shaped scale body when viewed from the end having each angle bisected by a longitudinal narrow groove; indicia printed on each side of each angle of the scale; and an opaque strip secured in said groove to separate the indicia by the strip to prevent interference in reading said indicia.

3. A device as set out in claim 1, including a longitudinal angled rib formed medially along each face of said scale.

4. A device as set out in claim 2, including a longitudinal raised rib formed along the medial portion of each side of said scale.

5. A device of the class described comprising a triangular elongated scale having three elongated faces; a groove bisecting each angle; a parting strip carried in each groove; and means medially of each face to raise the greater portion of the scale from the working surface.

CHARLES M. WARE.

REFERENCES CITED

The following references are of record in the file of this patent:

UNITED STATES PATENTS

| Number | Name | Date |
|---|---|---|
| 431,568 | Esser | July 8, 1890 |
| 2,365,735 | Ware | Dec. 26, 1944 |